United States Patent
Yamashita et al.

(10) Patent No.: US 6,221,805 B1
(45) Date of Patent: Apr. 24, 2001

(54) CATALYST SUPPORT AND CATALYST AND PROCESS FOR PRODUCING THE SAME

(75) Inventors: Koichi Yamashita, Susono; Shinji Tsuji, Numazu; Naoto Miyoshi, Nagoya; Oji Kuno, Susono; Masahiko Sugiyama, Mishima; Kazumasa Takatori, Aichi-gun; Takao Tani, Aichi-gun; Nobuo Kamiya, Aichi-gun, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/256,234

(22) Filed: Feb. 24, 1999

(30) Foreign Application Priority Data

| Mar. 4, 1998 | (JP) | ................................................... 10-052432 |
| Feb. 15, 1999 | (JP) | ................................................... 11-036270 |

(51) Int. Cl.⁷ ............................. B01J 23/04; B01J 23/40; B01J 23/58; B01J 23/10; B01J 23/14
(52) U.S. Cl. .......................... 502/332; 502/302; 502/303; 502/304; 502/325; 502/328; 502/329; 502/330; 502/333; 502/334; 502/339; 502/340; 502/341; 502/344; 502/349; 502/350; 502/351; 502/352; 502/355; 502/439
(58) Field of Search ...................... 502/325, 328, 502/332, 334, 355, 439, 302, 303, 304, 329, 330, 333, 339, 340, 341, 344, 349, 350, 351, 352

(56) References Cited

U.S. PATENT DOCUMENTS

| 4,624,941 | | 11/1986 | Berndt et al. . | |
| 5,492,870 | | 2/1996 | Wilcox et al. . | |
| 5,618,772 | * | 4/1997 | Suda et al. | ............................. 502/238 |
| 5,801,114 | * | 9/1998 | Durand et al. | ......................... 502/302 |
| 5,972,830 | * | 10/1999 | Yoshida et al. | ....................... 502/304 |

FOREIGN PATENT DOCUMENTS

| 7-75735 | 3/1995 | (JP) . |
| 7-81905 | 3/1995 | (JP) . |
| 8-73221 | 3/1996 | (JP) . |
| 9-262470 | 10/1997 | (JP) . |

\* cited by examiner

Primary Examiner—Elizabeth D. Wood
(74) Attorney, Agent, or Firm—Oliff & Berridge, PLC (57) ABSTRACT

A catalyst support, a catalyst using the catalyst support and a process for producing the same are disclosed. For instance, the catalyst support includes a composite oxide powder produced by spraying and burning a W/O type emulsion, the W/O type emulsion including an aqueous solution dispersed in an organic solvent, the aqueous solution containing aluminum as a major component and at least one co-metallic element in addition to the aluminum. Thus, the catalyst support can be produced less expensively without using any expensive alkoxide. Further, due to the spraying and burning, the composite oxide powder is composed of porous hollow particles which have a very thin shell thickness of dozens of nanometers, and makes the catalyst support which is amorphous and exhibits a large specific surface area. Hence, the catalyst support can maintain the large specific surface area even after a high-temperature durability test. Furthermore, the composite oxide powder includes the co-metallic element which is composited in such a highly dispersed manner that the agglomerated sulfates are less likely to be produced. Therefore, the catalyst support is inhibited from being poisoned by sulfur.

26 Claims, 1 Drawing Sheet

CATALYST SUPPORT AND CATALYST AND PROCESS FOR PRODUCING THE SAME

BACKGROUND OF THE INVENTION

1. Field of the Invention

The present invention relates to a high heat-resistant catalyst support which is used in an exhaust-gas-purifying catalyst, a catalyst which uses the catalyst support, and a process for producing the same.

2. Description of the Related Art

For instance, Japanese Unexamined Patent Publication (KOKAI) No. 7-075,735 discloses a catalyst support. The catalyst support is composed of amorphous alumina as a major component, and contains an $NO_x$ storage element which is composed of an alkali metal, an alkaline-earth metal or a rare-earth element. According to the publication, in the support, the alumina and the $NO_x$ storage element do not form stable compounds in a temperature range where the amorphous alumina does not crystallize. Consequently, the catalyst support is inhibited from exhibiting a decreased $NO_x$ storage ability. Further, since the $NO_x$ storage element can be mixed in the amorphous alumina in a highly dispersed manner, the sulfates are less likely to grow granularly even when the $NO_x$ storage element reacts with sulfuric oxides to produce the sulfates. Thus, the decrease in the $NO_x$ storage ability (i.e., the sulfur poisoning), which is caused by the granular growth of the sulfates, is less likely to occur. Furthermore, since the generated sulfates are very fine, they are likely to be reduced in a reducing atmosphere. Hence, the catalyst support has an advantage in that the $NO_x$ storage ability of the $NO_x$ storage element can be recovered.

The aforementioned catalyst support is produced by a sol-gel method in which an alkoxide is used as a raw material. However, since the alkoxide is expensive, the resulting catalyst support is expensive as well. Further, since the support powder, which is prepared by the sol-gel method, is constituted by fine particles, there might arise a possibility that the catalyst support exhibits a reduced specific surface area by granular growth when it is used at elevated temperatures exceeding 1,000° C.

SUMMARY OF THE INVENTION

The present invention has been developed in view of the aforementioned circumstances. It is therefore an object of the present invention to provide a catalyst support, which can be produced without using an alkoxide, which is less expensive and which is good in heat resistance, and a catalyst which uses the catalyst support.

A first aspect of the present invention is a catalyst support, comprising:

a composite oxide powder produced by spraying and burning a W/O type emulsion, the W/O type emulsion including an aqueous solution dispersed in an organic solvent, the aqueous solution containing aluminum as a major component and at least one co-metallic element in addition to the aluminum.

In the catalyst support, the co-metallic element can preferably be at least one member selected from the group consisting of alkaline-earth metals and rare-earth elements. Moreover, magnesium can preferably be excluded.

A second aspect of the present invention is a first catalyst, comprising:

a composite oxide powder produced by spraying and burning a W/O type emulsion, the W/O type emulsion including an aqueous solution dispersed in an organic solvent, the aqueous solution containing aluminum as a major component and a noble metal element.

A third aspect of the present invention is a second catalyst, comprising:

a composite oxide powder produced by spraying and burning a W/O type emulsion, the W/O type emulsion including an aqueous solution dispersed in an organic solvent, the aqueous solution containing aluminum as a major component, at least one co-metallic element selected from the group consisting of elements of group IIa in the periodic table of the elements, elements of group IIIa therein, elements of group IVa therein, elements of group Va therein, elements of group VIa therein, elements of group VIIa therein, elements of group IIb therein, Ga, Si, Ge and Sn, and a noble metal element.

A fourth aspect of the present invention is a third catalyst, comprising:

a catalyst support including:
  a composite oxide powder produced by spraying and burning a W/O type emulsion, the W/O type emulsion including an aqueous solution dispersed in an organic solvent, the aqueous solution containing aluminum as a major component and at least one co-metallic element selected from the group consisting of elements of group IIa in the periodic table of the elements, elements of group IIIa therein, elements of group IVa therein, elements of group Va therein, elements of group VIa therein, elements of group VIIa therein, elements of group IIb therein, Ga, Si, Ge and Sn; and
a noble metal loaded on the catalyst support.

A fifth aspect of the present invention is a fourth catalyst, comprising:

a catalyst support including:
  a composite oxide powder produced by spraying and burning a W/O type emulsion, the W/O type emulsion including an aqueous solution dispersed in an organic solvent, the aqueous solution containing aluminum as a major component and at least one co-metallic element in addition to the aluminum; and
a structure, loaded on the catalyst support, in which a noble metal is loaded on at least one member selected from the group consisting of strontium oxide and barium oxide.

In the fourth catalyst, the co-metallic element can preferably be at least one member selected from the group consisting of alkaline-earth metals.

A sixth aspect of the present invention is a process for producing the catalyst support, comprising the steps of:

preparing a W/O type emulsion including an aqueous solution dispersed in an organic solvent, the aqueous solution containing aluminum as a major component and at least one co-metallic element in addition to the aluminum; and spraying and burning the W/O type emulsion, thereby forming a composite oxide powder.

In the production process, the co-metallic element can preferably be at least one member selected from the group consisting of alkaline-earth metals and rare-earth elements. Moreover, magnesium can preferably be excluded.

A seventh aspect of the present invention is a process for producing the first catalyst, comprising the steps:

preparing a W/O type emulsion including an aqueous solution dispersed in an organic solvent, the aqueous solution containing aluminum as a major component and a noble metal element; and spraying and burning the W/O type emulsion, thereby forming a composite oxide powder.

An eighth aspect of the present invention is a process for producing the second catalyst, comprising the steps:

preparing a W/O type emulsion including an aqueous solution dispersed in an organic solvent, the aqueous solution containing aluminum as a major component, at least one co-metallic element selected from the group consisting of elements of group IIa in the periodic table of the elements, elements of group IIIa therein, elements of group IVa therein, elements of group Va therein, elements of group VIa therein, elements of group VIIa therein, elements of group IIb therein, Ga, Si, Ge and Sn, and a noble metal element; and spraying and burning the W/O type emulsion, thereby forming a composite oxide powder.

A ninth aspect of the present invention is a process for producing the third catalyst, comprising the steps:

preparing a W/O type emulsion including an aqueous solution dispersed in an organic solvent, the aqueous solution containing aluminum as a major component and at least one co-metallic element selected from the group consisting of elements of group IIa in the periodic table of the elements, elements of group IIIa therein, elements of group IVa therein, elements of group Va therein, elements of group VIa therein, elements of group VIIa therein, elements of group IIb therein, Ga, Si, Ge and Sn;

spraying and burning the W/O type emulsion, thereby forming a composite oxide powder; and loading a noble metal on the composite oxide powder.

The loading of the noble metal can preferably be carried out without using water for diluting a noble-metal chemical liquid, but by using an organic solvent, such as alcohol.

A tenth aspect of the present invention is a process for producing the fourth catalyst, comprising the steps:

preparing a W/O type emulsion including an aqueous solution dispersed in an organic solvent, the aqueous solution containing aluminum as a major component and at least one co-metallic element in addition to the aluminum;

spraying and burning the W/O type emulsion, thereby forming a composite oxide powder;

preparing a structure in which a noble metal is loaded on at least one member selected from the group consisting of strontium oxide and barium oxide; and loading the structure on the composite oxide powder.

In the production process of the fourth catalyst, the co-metallic element can preferably be at least one member selected from the group consisting of alkaline-earth metals.

Thus, the catalyst support and the catalysts according to the present invention can be synthesized at a reduced cost and are less expensive, because no alkoxide is used.

Since the catalyst support and the catalysts according to the present invention are synthesized by the spraying and burning method of the W/O type emulsion, the particle diameters of the dispersions in the emulsion can be enlarged to a certain extent. Accordingly, the resulting composite oxide powder can be hollow. As a result, even when the particle diameters of the catalyst support and the catalysts are large, it is possible to achieve a high specific surface area. Since the primary particle diameters are large, the catalyst support and the catalysts are less likely to grow granularly at elevated temperatures. Thus, even after a high-temperature durability test, the catalyst support and the catalysts can maintain their high activities.

Further, in the spraying and burning method of the W/O type emulsion, a mixture solution, in which two or more metallic elements are mixed, is turned into an amorphous composite oxide in a short period of time. Accordingly, the two or more metallic elements exist in a highly dispersed manner, and are highly stabilized. When a noble metal is composited in the amorphous composite oxide, the noble metal exists in a highly dispersed manner, and is inhibited from growing granularly at elevated temperatures. In addition, the dispersibiity of the noble metal can be further improved by compositing the co-metallic element. Consequently, even after a durability test, the catalyst support and the catalysts can maintain their high purifying activities.

Furthermore, when the alkaline-earth metals or the rare-earth elements are used as the co-metallic element, they exist in a highly dispersed manner. Accordingly, even if they are subjected to the sulfur poisoning, they are less likely to be turned into agglomerated sulfates. Namely, since the catalyst support and the catalysts are inhibited from being poisoned by sulfur, they are good in their durability in terms of the $NO_x$ storage ability and the $NO_x$ purifying performance.

Moreover, when the catalyst support according to the present invention is loaded with the structure according to the present invention, the catalyst support and the structure are less likely to react with each other. Consequently, they make the fourth catalyst which is stable at elevated temperatures. Namely, the fourth catalyst is good in the heat resistance.

BRIEF DESCRIPTION OF THE DRAWING

A more complete appreciation of the present invention and many of its advantages will be readily obtained as the same becomes better understood by reference to the following detailed description when considered in connection with the accompanying drawing and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

In the spraying and burning method of the W/O type emulsion employed by the present production process, a particle diameter of the respective dispersion particles (e.g., from a couple of nanometers to a couple of micrometers) in the emulsion is the size of a reaction field. Namely, in the sprayed mist, the dispersion particles in the emulsion are atomized particles which are composed of water phase and are covered by an oil film including the organic solvent. When the sprayed mist is once ignited, the combustion of the oil film is induced. Due to the resulting heat generation, the atomized particles are exposed to elevated temperatures, the metals in the water phase of the atomized particles are oxidized to produce the composite oxide powder. Since the atomized particles are very fine, it is possible to inhibit generating heat distributions among the respective particles. Thus, the homogeneous composite oxide powder can be prepared. In addition, the amorphous composite oxide powder can be produced with ease.

When the dispersion particles of the W/O type emulsion contain aluminum as a major component, porous hollow particles are likely to be formed by the spray combustion. The hollow particles have a shell thickness of dozens of nanometers which are very thin. At present, the causes are not clear. However, it is assumed as follows. Since the superficial oxide film forming rate of aluminum ions is fast, the superficial oxide film is formed on the surface of the particles at an early stage of the particle contraction. As a result, the porous hollow particles having a very thin thickness are prepared.

In the spraying and burning of the W/O type emulsion, the diameter of the respective dispersion diameter is the size of the respective reaction fields as set forth above. When the diameter of the dispersion particles in the emulsion is smaller than 100 nm, the particles are contracted completely before the superficial oxide film is formed so that they do not make the hollow particles. Thus, such a small diameter is not preferable. When the diameter of the dispersion particles is more than 10 μm, the reactions fields are so large that there arises a possibility that the resulting particles become inhomogeneous. Thus, such a large diameter is not preferable. When the diameter of the dispersion particles falls in the range of from 100 nm to 10 μm, the outside particle diameter of the particles of the resulting composite oxide powder falls in the range of from 20 to 5,000 nm, further preferably from 20 to 2,000 nm.

The combustion temperature can preferably fall in the range of 900° C. or less, further preferably from 650 to 800° C. When the combustion temperature exceeds 900° C., a part of the products grow granularly to turn into a crystalline powder and the specific surface area of the products decreases. In addition, the resulting alumina reacts with the $NO_x$ storage element to produce stable compounds so that the purifying performance of the resulting composite oxide powder degrades unpreferably.

The concentration of the dispersion particles in the W/O type emulsion can preferably fall in the range of from 0.2 to 2 mol/L by metallic conversion. When the concentration falls outside the range, the dispersion particles are less likely to make the hollow composite oxide powder.

According to this production process, no alkoxide is used, but less expensive metallic salts can be used. Consequently, the amorphous composite oxide powder can be produced less expensively.

The present catalyst support is a composite oxide support which is produced by the present production process which comprises the steps of: preparing a W/O type emulsion including an aqueous solution dispersed in an organic solvent, the aqueous solution containing aluminum as a major component and at least one co-metallic element in addition to the aluminum; and spraying and burning the W/O type emulsion, thereby forming a composite oxide powder.

The composite oxide powder can preferably be hollow particles. With this arrangement, the composite oxide powder makes a catalyst support having a high specific surface area. Thus, when the composite oxide powder is made into a catalyst, the activity is improved remarkably. The outside particle diameter of the composite oxide powder can preferably fill in the range of from 20 to 5,000 nm, further preferably from 20 to 2,000 nm. When the outside particle diameter is smaller than 20 nm, the hollow does not exist in the particles. Whilst, it is impossible to produce a powder whose outside particle diameter exceeds 5,000 nm by the present production process. According to the present production process, it is easy to produce the hollow composite oxide powder which has an outside particle diameter falling in the range.

The aforementioned composite oxide powder can contain a crystalline portion, but can preferably be amorphous. With this arrangement, when the composite oxide powder is made into a catalyst containing an $NO_x$ storage element, it is suppressed to generate stable compounds cooperatively with the $NO_x$ storage element. Thus, the $NO_x$ storage ability is inhibited from decreasing.

The aforementioned composite oxide powder is good in heat resistance. Namely, the present catalyst support does not vary the specific surface area by a heat treatment which is carried out at 1,100° C. or less. In addition, it maintains the amorphous structure. These advantages are closely related to the arrangement that it is formed as hollow particles. For example, when one tries to prepare a powder which is formed as solid particles, which has a specific surface area of 50 $m^2/g$ or more and which contains alumina as a major component, it is necessary to adjust a primary particle diameter to about 30 nm or less. In general, since small particles are highly active, they are likely to grow granularly at elevated temperatures. On the other hand, the aforementioned composite oxide powder can be made into hollow particles which have a very thin thickness. Accordingly, even when the composite oxide powder has a particle diameter of hundreds nanometers or more, it can have a specific surface area of 50 $m^2/g$ or more. Despite the specific surface area, the composite oxide powder has a large particle diameter, and produces an advantage in that it is less likely to grow granularly.

Hence, the aforementioned composite oxide powder has both of the high specific surface area of 50 $m^2/g$ or more and the high heat resistance simultaneously. Thus, it exhibits sufficient performance as a catalyst support. When the specific surface area is less than 50 $m^2/g$, it might exhibit insufficient performance as a catalyst support sometimes.

The co-metallic element in the present catalyst support is not limited in particular. Any element can be used as far as it acts favorably when it is composited with the alumina which is made from aluminum. For example, the co-metallic element can be at least one metallic element selected from the group consisting of elements of group IIa in the periodic table of the elements, elements of group IIIa therein, elements of group IVa therein, elements of group Va therein, elements of group VIa therein, elements of group VIIa therein, elements of group IIb therein, Ga, Si, Ge and Sn. When Ti, Zr or Si is used out of these metallic elements, a porous composite support, in which Ti, Zr or Si is composited with the alumina, can be formed. Further, it is preferable to select at least one co-metallic element from the group consisting of alkaline-earth metals and rare-earth element. Since alkali metals, alkaline-earth metals and rare-earth elements adsorb $NO_x$, they are needed in $NO_x$ storage-and-decomposition type catalysts. However, since alkali metals are likely to move by a heat treatment, alkali metals have a problem in view of the heat resistance. Additionally, Mg has a smaller ion radius in alkaline-earth metals, and accordingly has a problem in view of the heat resistance. Therefore, in the present invention, it is preferable not to use Mg.

The present catalyst support is produced by spraying and burning the W/O type emulsion, and employs a metallic salt as a raw material. Hence, it is less expensive than conventional amorphous catalyst supports.

The first catalyst of the present invention is a composite oxide powder which is produced by the present production step which comprises the steps of: preparing a W/O type emulsion including an aqueous solution dispersed in an organic solvent, the aqueous solution containing aluminum as a major component and a noble metal element; and spraying and burning the W/O type emulsion, thereby forming a composite oxide powder.

This composite oxide powder is formed by compositing the alumina and the noble metal. The noble metal effects the catalytic action. Similarly to the aforementioned catalyst support, this composite oxide powder can preferably be amorphous and hollow. With this arrangement, it has a high specific surface area, and accordingly is highly active. In addition, it is inhibited from exhibiting a reduced specific surface area even at elevated temperatures. Consequently, the noble metal is suppressed to grow granularly, and has an improved durability. Still, since the noble metal is held in the alumina in a highly dispersed manner, it has a high activity, and is inhibited from growing granularly.

The noble metal employed herein can be at least one member selected from the group consisting of Pt, Rh, Pd, Ir and Ru.

The second catalyst of the present invention is a composite oxide powder which is produced by the present production process which comprises the steps of: preparing a W/O type emulsion including an aqueous solution dispersed in an organic solvent, the aqueous solution containing aluminum as a major component, at least one co-metallic element selected from the group consisting of elements of group IIa in the periodic table of the elements, elements of group IIIa therein, elements of group IVa therein, elements of group Va therein, elements of group VIa therein, elements of group VIIa therein, elements of group IIb therein, Ga, Si, Ge and Sn, and a noble metal element; and spraying and burning the W/O type emulsion, thereby forming a composite oxide powder.

This composite oxide powder is formed by compositing at least three elements, the aluminum, the co-metallic element and the noble metal. When the co-metallic element is, for example, an alkaline-earth metal or a rare-earth element, it effects the $NO_x$ storage ability. The noble metal effects the catalytic activity. Since the alkaline-earth metal or the rare-earth element, used as the co-metallic element, is dispersed highly in the composite oxide powder in an atomic manner, it is less likely to be turned into agglomerated sulfates. Accordingly, the composite oxide powder can make an $NO_x$ storage-and-decomposition type catalyst which is inhibited from being poisoned by sulfur and which is good in the durability. Thus, the second catalyst is very useful as an $NO_x$ storage-and-decomposition type catalyst.

Similarly to the aforementioned catalyst support, this composite oxide powder can preferably be amorphous and hollow, and can preferably have an outside particle diameter falling in the range of from 20 to 5,000 nm, further preferably from 20 to 2,000 nm. With these arrangements, it has a high specific surface area, and accordingly is highly active. In addition, it is inhibited from exhibiting a reduced specific surface area even at elevated temperatures. Consequently, the noble metal is suppressed to grow granularly, and has an improved durability.

Moreover, there arises another advantage that the dispersion stability of the noble metal is enhanced by compositing the co-metallic element with the noble metal. The noble metal employed herein can be at least one member selected from the group consisting of Pt, Rh, Pd, Ir and Ru.

The third catalyst of the present invention is a composite oxide powder which is produced by the present production process which comprises the steps of: preparing a W/O type emulsion including an aqueous solution dispersed in an organic solvent, the aqueous solution containing aluminum as a major component and at least one co-metallic element selected from the group consisting of elements of group IIa in the periodic table of the elements, elements of group IIIa therein, elements of group IVa therein, elements of group Va therein, elements of group VIa therein, elements of group VIIa therein, elements of group IIb therein, Ga, Si, Ge and Sn; spraying and burning the W/O type emulsion, thereby forming a composite oxide powder; and loading a noble metal on the composite oxide powder.

This composite oxide powder is formed by compositing the aluminum and the co-metallic element, and is loaded with the noble metal. When the co-metallic element is, for example, an alkaline-earth metal or a rare-earth element, it effects the $NO_x$ storage ability. The noble metal effects the catalytic activity. Thus, the third catalyst is useful as an $NO_x$ storage-and-decomposition type catalyst. Similarly to the aforementioned catalyst support, this composite oxide powder can preferably be amorphous and hollow, and can have an outside particle diameter falling in the range of from 20 to 5,000 nm, further preferably from 20 to 2,000 nm. With these arrangements, it has a high specific surface area, and accordingly is highly active. In addition, it is inhibited from exhibiting a reduced specific surface area even at elevated temperatures. Consequently, the noble metal is suppressed to grow granularly, and has an improved durability.

When the alkaline-earth metal or the rare-earth element is used as the co-metallic element, it is dispersed highly in the composite oxide powder in an atomic manner, it is less likely to be turned into agglomerated sulfates. Accordingly, the composite oxide powder can make an $NO_x$ storage-and-decomposition type catalyst which is inhibited from being poisoned by sulfur and which is good in the durability.

The noble metal employed herein can be at least one member selected from the group consisting of Pt, Rh, Pd, Ir and Ru.

Note that, when the noble metal is loaded on the composite oxide powder, it is preferable not to use water for diluting a noble-metal chemical liquid, but to use an organic solvent, such as alcohol. When water is used, there might arise a case where the water soluble components in the composite oxide powder elute out to destroy the hollow structure.

The fourth catalyst of the present invention comprises: a catalyst support including: a composite oxide powder produced by spraying and burning a W/O type emulsion, the W/O type emulsion including an aqueous solution dispersed in an organic solvent, the aqueous solution containing aluminum as a major component and at least one co-metallic element in addition to the aluminum; and a structure, loaded on said catalyst support, in which a noble metal is loaded on at least one member selected from the group consisting of strontium oxide and barium oxide.

The catalyst support is identical with the aforementioned catalyst support of the present invention. One of the major features of the fourth catalyst lies in that the structure is loaded on the aforementioned catalyst support.

The structure is made by loading the noble metal on at least one of the strontium oxide and the barium oxide. In the structure, the ions or the clusters of the loaded noble metal are extremely stable even at a high temperature of 1,000° C., and exist stably as particles having a particle diameter of 10 nm or less. The catalyst support and the structure are less likely to react with each other. Accordingly, the fourth catalyst of the present invention is extremely good in the durability, because the structure is loaded stably on the catalyst support even after the fourth catalyst is subjected to a durability test at 1,000° C., and because the noble metal is suppressed to grow granularly.

In the fourth catalyst, the co-metallic element in the catalyst support can especially preferably be one of alkaline-earth metals. With this arrangement, since the affinity between the catalyst support and the structure is enhanced, the loading stability of the structure is improved. However, the catalyst support and the structure are less likely to react with each other. Moreover, since the alkaline-earth metal, used as the co-metallic element, is highly dispersed in the catalyst support in an atomic manner, it is less likely to be turned into agglomerated sulfates. Accordingly, the fourth catalyst can make an $NO_x$ storage-and-decomposition type catalyst which is inhibited from being poisoned by sulfur and which is good in the durability. The noble metal employed herein can be at least one member selected from the group consisting of Pt, Rh, Pd, Ir and Ru.

As set forth in specific examples described below, the structure can be easily loaded on the catalyst support by forming the structure in the presence of the catalyst-support powder.

In the aforementioned catalyst support and the four catalysts, the amount of the co-metallic element can preferably fall in the range of from 5 to 50 mol with respect to 100 mol of the aluminum. The amount of the noble metal can preferably fall in the range of from 0.5 to 5 g with respect to 100 g of the composite oxide powder. When the amount of the co-metallic element is too less, the benefits resulting from the compositing cannot be obtained; and when it is too much, the catalytic activity degrades. Whilst, when the amount of the noble metal is too less, the catalytic activity degrades; and when it is too much, the catalytic activity saturates and the excessive noble metal is wasted.

The raw materials of the respective metallic elements used in the present production process can be salts. For instance, the salts can be water-soluble metallic salts, such as metallic nitrates, metallic acetates, metallic suites and metallic chlorides, or complex salts.

The W/O emulsion can be formed by stirring the organic solvent and an aqueous solution of the aforementioned metallic salts by a way of a dispersant. The organic solvent used herein can be an organic solvent, such as hexane, octane, kerosene and gasoline, which can form the W/O emulsion together with the aqueous solution.

The types of the used dispersant herein and the addition amount of the same are not limited in particular. For example, any one of cationic surfactants, anionic surfactants and nonionic surfactants can be used. Depending on the types of the aqueous solution and the organic solvent and on the particle diameter of the dispersion particles in the required emulsion, it is possible to vary the types and the addition amount of the dispersant.

In the method of spraying and burning the W/O emulsion, the composite oxide can be synthesized directly out of the solution containing the metallic salts. Hence, no alkoxide raw materials are required contrary to the sol-gel method. Moreover, no subsequent processes, such as drying, calcining and pulverizing, are required. The composite oxide can be produced by a simplified process at a low cost. In addition, the amorphous hollow particles can be formed with ease.

Concerning the atmosphere in which the W/O emulsion is sprayed and burned, it is not limited in particular. However, when there is not enough oxygen, there might arise a fear for residing the carbon components of the organic solvent in the resulting composite oxide powder because of the incomplete combustion. Therefore, it is preferable to supply oxygen (or air) in such an amount that the organic solvent can undergo the complete combustion.

Depending on the shell thickness, the hollow particles obtained by the present invention have a specific surface area which is from 5 to 10 times or more of that of spherical solid particles. Hence, compared with solid particles having the same specific surface area, the hollow particles have the large outside particle diameter, and can be readily dealt with. Thus, they are useful to make a catalyst support or a catalyst for purifying an exhaust gas.

The present invention will be hereinafter described in detail with reference to the following specific examples.

EXAMPLE NO. 1

A 0.01 to 2 mol/L aluminum nitrate aqueous solution and a 0.01 to 0.3 mol/L barium nitrate aqueous solution were mixed in predetermined amounts so that the molar ratio of the aluminum to the barium was Al/Ba=12/1. The aluminum nitrate aqueous solution was prepared by dissolving commercially available aluminum nitrate ($Al(NO_3)_3.9H_2O$) into deionized water. The barium nitrate aqueous solution was prepared by dissolving commercially available barium nitrate into deionized water. A water phase was thus prepared. As the organic solvent, commercially available kerosene was used.

As the dispersant, "SUN SOFT No. 818H" made by Taiyo Kagaku Co., Ltd. was used. The addition amount of the dispersant fell in the range of from 5 to 10% by weight with respect to the kerosene. The kerosene containing the dispersant made an oil phase. The water phase and the oil phase were mixed so that the ratio of the water phase to the oil phase fell in the range of from 40 to 70% by volume to 60 to 30% by volume (i.e., (water phase)/(oil phase)=(40–70% by volume)/(60–30% by volume)). The mixture solution was stirred by using a homogenizer at a revolving speed of from 1,000 to 20,000 rpm for from 5 to 30 minutes. A W/O type emulsion was thus prepared. According to the result of an observation using an optical microscope, the particle diameter of the dispersion particles in the emulsion fell in the range of from about 1 to 2 $\mu$m.

The resulting W/O type emulsion was sprayed by using an emulsion-burning reactor which is disclosed in Japanese Unexamined Patent Publication No. 7-81,905. The oil phase was burned, and simultaneously the metallic ions, which existed in the water phase, were oxidized. Thus, a composite oxide powder was formed.

The synthesis was carried out under the controlled state, in which the flow rate of the sprayed emulsion and the air amount (or oxygen amount) were controlled, so that the sprayed emulsion was combusted completely and the flame temperature was a fixed temperature falling in the range of from 650 to 800° C. The resulting powder was collected by a bag filter which was disposed at the rear of the reactor tube.

The thus collected powder was held in an electric furnace, and was subjected to a heat treatment, which was carried out in air at 4 levels, 800° C., 900° C., 1,000° C. and 1,100° C. for 4 hours, respectively. The specific surface area of the composite oxide powder was measured before and after the heat treatment by the BET method, and was evaluated on the variation of the specific surface area caused by the heat treatment.

EXAMPLE NO. 2

The aluminum nitrate aqueous solution prepared in Example No. 1 and a 0.1 to 2 mol/L magnesium nitrate aqueous solution were mixed in predetermined amounts so that the molar ratio of the aluminum to the magnesium was Al/Mg=12/1. The magnesium nitrate aqueous solution was prepared by dissolving commercially available magnesium nitrate (Mg(NO$_3$)$_2$.6H$_2$O) into deionized water. A water phase was thus prepared. Except these arrangements, a composite oxide powder was synthesized under the same conditions as those of Example No. 1, and was subjected to the heat treatment to evaluate the variation of the specific surface area in the same manner as Example No. 1.

Reference Example

A commercially available γ-Al$_2$O$_3$ powder was subjected to the heat treatment to evaluate the variation of the specific surface area in the same manner as Example No. 1.

Figure 1:
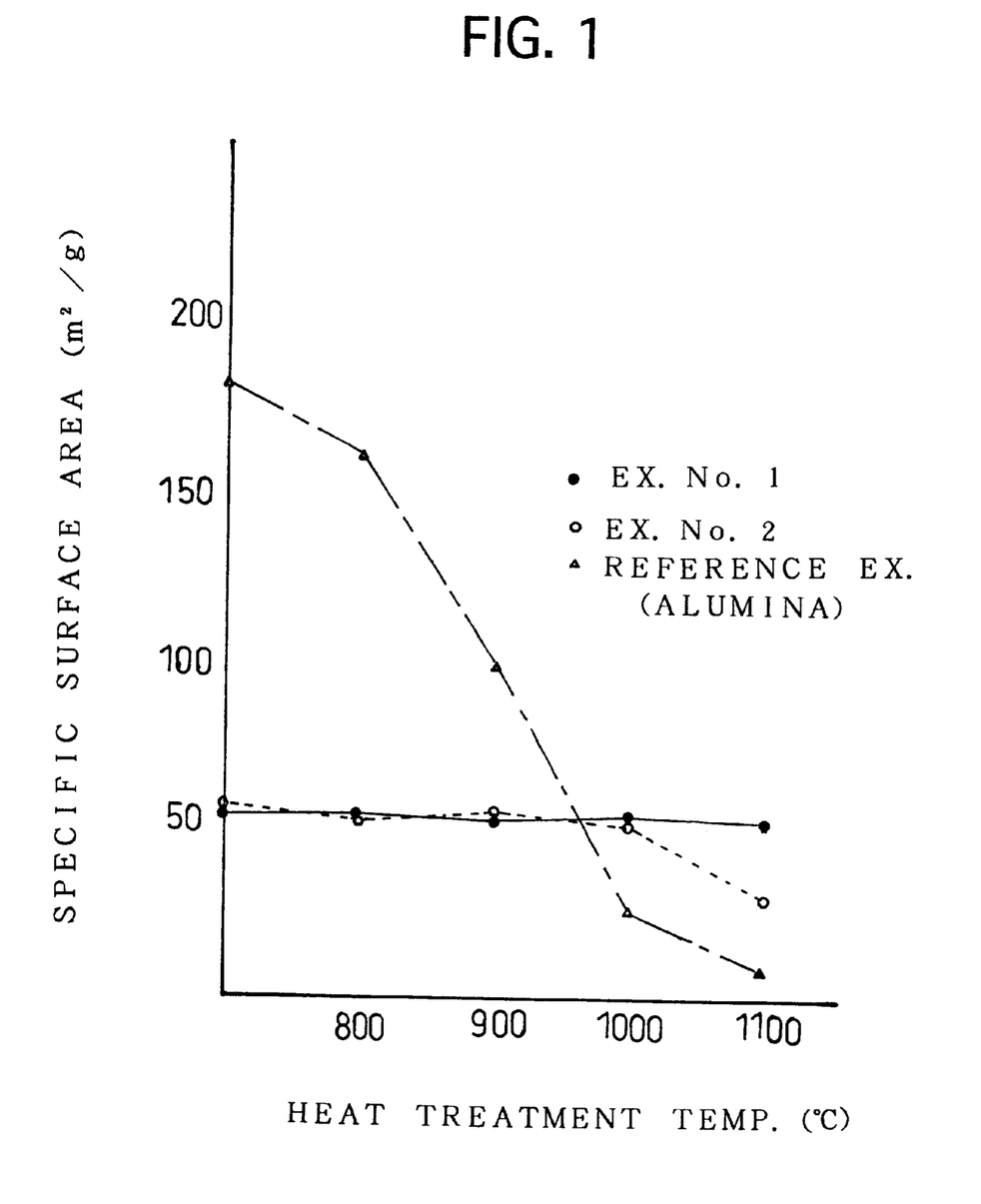
FIG. 1 is a graph for illustrating the relationships between the heat treatment temperatures of the powders of Example No. 1, Example No. 2 and Reference Example and specific surface areas exhibited by the same.

FIG. 1 illustrates the variations of the specific surface areas caused by the heat treatment, variations which were exhibited by the composite oxide powders synthesized in Example No. 1 and Example No. 2 and by the alumina powder of Reference Example. The following are understood from the drawing. The alumina powder of Reference Example exhibited a sharply reduced specific surface area when it was subjected to the heat treatments of 800° C. or more. Whilst, the composite oxide powders of Example No. 1 and Example No. 2 exhibited stable heat resistance even when they were subjected to the heat treatment of 1,000° C.

However, Example No. 1 did not vary the specific surface area when it was subjected to the heat treatments up to 1,100° C. Whilst, Example No. 2 exhibited the specific surface area which was equivalent to that of Example No. 1, but exhibited a reduced specific surface area when it was subjected to the heat treatment of 1,100° C. Accordingly, the crystalline phases of these powders were examined by the powder X-ray diffraction method. The composite oxide powder of Example No. 1 kept to be amorphous even after it was subjected to the heat treatments. Whilst, when the composite oxide powder of Example No. 2 was subjected to the heat treatment of 1,100° C., there arose crystalline phases, such as a spinel phase. Therefore, it is possible to report that, as the co-metallic element, barium is more preferable than magnesium.

EXAMPLE NO. 3

Except that the mixing ratio of the aluminum nitrate aqueous solution to the barium nitrate aqueous solution (i.e., the molar ratio of the aluminum to the barium) was varied to Al/Ba=4/1, a composite oxide powder was synthesized in the same manner as Example No. 1, and was subjected to the heat treatment similarly. As a result, the resulting composite oxide exhibited a specific surface area of 51 m$^2$/g. Moreover, it was verified that the specific surface area and the crystalline structure were not varied up to 1,100° C.

EXAMPLE NO. 4

Except that the mixing ratio of the aluminum nitrate aqueous solution to the barium nitrate aqueous solution (i.e., the molar ratio of the aluminum to the barium) was varied to Al/Ba=24/1, a composite oxide powder was synthesized in the same manner as Example No. 1, and was subjected to the heat treatment similarly. As a result, the resulting composite oxide exhibited a specific surface area of 60 m$^2$/g. Moreover, it was verified that the specific surface area and the crystalline structure were not varied up to 1,100° C.

EXAMPLE NO. 5

The aluminum nitrate aqueous solution prepared in Example No. 1 and a 0.01 to 2 mol/L strontium nitrate aqueous solution were mixed in predetermined amounts so that the molar ratio of the aluminum to the strontium was Al/Sr=12/1. The strontium nitrate aqueous solution was prepared by dissolving commercially available strontium nitrate into deionized water. A water phase was thus prepared. Except these arrangements, a composite oxide powder was synthesized by the same process as that of Example No. 1, and was subjected to the heat treatment similarly. As a result, the resulting composite oxide exhibited a specific surface area of 55 m$^2$/g. Moreover, it was verified that the specific surface area and the crystalline structure were not varied up to 1,100° C.

EXAMPLE NO. 6

The aluminum nitrate aqueous solution prepared in Example No. 1 and a 0.01 to 2 mol/L lanthanum nitrate aqueous solution were mixed in predetermined amounts so that the molar ratio of the aluminum to the lanthanum was Al/Ln=12/1. The lanthanum nitrate aqueous solution was prepared by dissolving commercially available lanthanum nitrate (La(NO$_3$)$_3$.6H$_2$O) into deionized water. A water phase was thus prepared. Except these arrangements, a composite oxide powder was synthesized by the same as that of Example No. 1, and was subjected to the heat treatment similarly. As a result, the resulting composite oxide exhibited a specific surface area of 52 m$^2$/g. Moreover, it was verified that the specific surface area and the crystalline structure were not varied up to 1,100° C.

EXAMPLE NO. 7

A first mixture solution was prepared, and included 100 g of a 0.3 mol/L barium nitrate aqueous solution and 500 g of a 0.72 mol/L aluminum nitrate aqueous solution. 6.215 g of a dinitrodiammine platinum aqueous solution was added to the first mixture solution, and was stirred to be homogeneous. The dinitrodiammine platinum aqueous solution had a Pt concentration of 4.616% by weight. A second mixture solution was thus prepared.

Whilst, 21.12 g of an emulsifier ("SUN SOFT No. 818H" made by Taiyo Kagaku Co., Ltd.) was dissolved into 352 g of kerosene. While stirring the mixture with a homogenizer at a revolving speed of 10,000 rpm, all of the second mixture solution was added to the mixture little by little. After all of the second mixture solution was added, the mixture was kept to be stirred by the homogenizer for 10 minutes. A W/O type emulsion was thus prepared. According to the result of an observation using an optical microscope, the particle diameter of the dispersion particles in the W/O type emulsion fell in the range of from about 1 to 2 μm.

The resulting W/O type emulsion was sprayed and burned in the same manner as Example No. 1. The resulting composite oxide powder was collected with a bag filter. This composite oxide powder was subjected to a heat treatment in air at 800° C. for 3 hours. The resulting composite oxide powder was hollow, and exhibited a BET specific surface area of 48 m$^2$/g.

The arrangement of this catalyst was Pt:Ba:Al:O= 0.04903:1.000:12.00:19.00 by elemental molar ratio. Note that the content of Pt was 1.250% by weight.

EXAMPLE NO. 8

500 g of a 0.72 mol/L aluminum nitrate aqueous solution was prepared. Then, 4.970 g of a dinitrodiammine platinum aqueous solution was added to the aluminum nitrate aqueous solution, and was stirred to be homogeneous. The dinitrodiammine platinum aqueous solution had a Pt concentration of 4.616% by weight. A mixture solution was thus prepared.

Whilst, 17.64 g of an emulsifier ("SUN SOFT No. 818H" made by Taiyo Kagaku Co., Ltd.) was dissolved into 294 g of kerosene. While stirring the mixture with a homogenizer at a revolving speed of 10,000 rpm, all of the mixture solution was added to the mixture little by little. After all of the mixture solution was added, the mixture was kept to be stirred by the homogenizer for 10 minutes. A W/O type emulsion was thus prepared. According to the result of an observation using an optical microscope, the particle diameter of the dispersion particles in the W/O type emulsion fell in the range of from about 1 to 2 μm.

The resulting W/O type emulsion was sprayed and burned in the same manner as Example No. 7. The resulting composite oxide powder was collected with a bag filter. This composite oxide powder was subjected to a heat treatment in air at 800° C. for 3 hours. The resulting composite oxide powder was hollow, and exhibited a BET specific surface area of 61 $m^2/g$.

The arrangement of this catalyst was Pt:Al:O= 0.00653:2.000:3.000 by elemental molar ratio. Note that the content of Pt was 1.250% by weight.

EXAMPLE NO. 9

500 g of a 1.0 mol/L aluminum nitrate aqueous solution was prepared. Then, 1.170 g of an $SiO_2$ powder and 8.746 g of a tetraammine platinum aqueous solution was added to the aluminum nitrate aqueous solution, and was stirred to be homogeneous. The tetraammine platinum aqueous solution had a Pt concentration of 4.616% by weight. A mixture solution was thus prepared. Then, a W/O emulsion was prepared in the same manner as Example No. 7, and was sprayed and burned similarly. The collected powder was subjected to a heat treatment. The resulting catalyst powder was hollow, and exhibited a BET specific surface area of 71 $m^2/g$.

The arrangement of this catalyst was Pt:Si:Al:O= 0.04305:1.000:12.00:20.00 by elemental molar ratio. Note that the content of Pt was 1.25% by weight.

EXAMPLE NO. 10

Except that 100 g of a 0.3 mol/L nickel nitrate aqueous solution was used instead of 100 g of the 0.3 mol/L barium nitrate solution, and that 5.577 g of a dinitrodiammine platinum aqueous solution (the concentration of Pt was 4.616% by weight) was used instead of 6.215 g of the dinitrodiammine platinum aqueous solution (the concentration of Pt was 4.616% by weight), a catalyst was prepared in the same manner as Example No. 7. The resulting catalyst powder was hollow, and exhibited a BET specific surface area of 43 $m^2/g$.

The arrangement of this catalyst was Pt:Ni:Al:O= 0.04399:1.000:12.00:19.00 by elemental molar ratio. Note that the content of Pt was 1.25% by weight.

EXAMPLE NO. 11

Except that 100 g of a 0.3 mol/L titanium tetrachloride aqueous solution was used instead of 100 g of the 0.3 mol/L barium nitrate solution, and that 4.594 g of an $Rh(NO_3)_3 \cdot 2H_2O$ aqueous solution (the concentration of Rh was 4.616% by weight) was used instead of 6.215 g of the dinitrodiammine platinum aqueous solution (the concentration of Pt was 4.616% by weight), a catalyst was prepared in the same manner as Example No. 7. The resulting catalyst powder was hollow, and exhibited a BET specific surface area of 52 $m^2/g$.

The arrangement of this catalyst was Rh:Ti:Al:O= 0.04156:1.000:12.00:20.00 by elemental molar ratio. Note that the content of Rh was 0.672% by weight.

EXAMPLE NO. 12

Except that 100 g of a 0.3 mol/L lanthanum nitrate aqueous solution was used instead of 100 g of the 0.3 mol/L barium nitrate solution, and that 5.146 g of an $Rh(NO_3)_3 \cdot 2H_2O$ aqueous solution (the concentration of Rh was 3.025% by weight) was used instead of 6.215 g of the dinitrodiammine platinum aqueous solution (the concentration of Pt was 4.616% by weight), a catalyst was prepared in the same manner as Example No. 7. The resulting catalyst powder was hollow, and exhibited a BET specific surface area of 39 $m^2/g$.

The arrangement of this catalyst was Rh:La:Al:O= 0.05060:1.000:12.00:19.50 by elemental molar ratio. Note that the content of Rh was 0.672% by weight.

EXAMPLE NO. 13

Except that 100 g of a 0.3 mol/L $MoCl_5$ aqueous solution was used instead of 100 g of the 0.3 mol/L barium nitrate solution, and that 3.869 g of a palladium nitrate aqueous solution (the concentration of Pd was 4% by weight) was used instead of 6.215 g of the dinitrodiammine platinum aqueous solution (the concentration of Pt was 4.616% by weight), a catalyst was prepared in the same manner as Example No. 7. The resulting catalyst powder was hollow, and exhibited a BET specific surface area of 30 $m^2/g$.

The arrangement of this catalyst was Pd:Mo:Al:O= 0.04849:1.000:12.00:20.50 by elemental molar ratio. Note that the content of Pd was 0.672% by weight.

EXAMPLE NO. 14

Except that 100 g of a 0.3 mol/L cobalt nitrate aqueous solution was used instead of 100 g of the 0.3 mol/L barium nitrate solution, and that 3.432 g of a dinitrodiammine platinum aqueous solution (the concentration of Pt was 4.616% by weight) and 1.045 g of an $Rh(NO_3)_3 \cdot 2H_2O$ aqueous solution (the concentration of Rh was 3.025% by weight) were used instead of 6.215 g of the dinitrodiammine platinum aqueous solution (the concentration of Pt was 4.616% by weight), a catalyst was prepared in the same manner as Example No. 7. The resulting catalyst powder was hollow, and exhibited a BET specific surface area of 30 $m^2/g$.

The arrangement of this catalyst was Pt:Rh:Co:Al:O= 0.02707:0.01028:1.000:12.00:19.00 by elemental molar ratio. Note that the content of Pt was 0.769% by weight and the content of Rh was 0.154% by weight.

EXAMPLE NO. 15

Except that 100 g of a 0.3 mol/L iron (III) nitrate aqueous solution was used instead of 100 g of the 0.3 mol/L barium nitrate solution, and that 3.416 g of a dinitrodiammine platinum aqueous solution (the concentration of Pt was 4.616% by weight) and 1.041 g of an $Rh(NO_3)_3 \cdot 2H_2O$ aqueous solution (the concentration of Rh was 3.025% by weight) were used instead of 6.215 g of the dinitrodiammine platinum aqueous solution (the concentration of Pt was 4.616% by weight), a catalyst was prepared in the same manner as Example No. 7. The resulting catalyst powder was hollow, and exhibited a BET specific surface area of 35 $m^2/g$.

The arrangement of this catalyst was Pt:Rh:Fe:Al:O= 0.02695:0.01023:1.000:12.00:19.00 by elemental molar ratio. Note that the content of Pt was 0.769% by weight and the content of Rh was 0.154% by weight.

EXAMPLE NO. 16

Except that 80 g of a 0.3 mol/L barium nitrate aqueous solution and 20 g of 0.3 mol/L lanthanum nitrate aqueous solution were used instead of 100 g of the 0.3 mol/L barium nitrate solution, and that 6.231 g of a dinitrodiammine platinum aqueous solution (the concentration of Pt was 4.616% by weight) was used instead of 6.215 g of the dinitrodiammine platinum aqueous solution (the concentration of Pt was 4.616% by weight), a catalyst was prepared in the same manner as Example No. 7. The resulting catalyst powder was hollow, and exhibited a BET specific surface area of 59 $m^2/g$.

The arrangement of this catalyst was Pt:Ba:La:Al:O= 0.04915:0.800:0.200:12.00:19.10 by elemental molar ratio. Note that the content of Pt was 1.25% by weight.

EXAMPLE NO. 17

100 g of a 0.3 mol/L barium nitrate aqueous solution and 500 g of 0.72 mol/L aluminum nitrate aqueous solution were stirred to be homogeneous. A mixture solution was thus prepared. Then, a W/O emulsion was prepared by using this mixture solution in the same manner as Example No. 7, and was sprayed and burned to collect a composite oxide powder. This composite oxide powder exhibited a specific surface area of 44 $m^2/g$.

The composite oxide powder was subjected to a heat treatment in air at 800° C. for 3 hours, and was subsequently subjected to a further heat treatment in air at 1,000° C. for 5 hours. Then, 120 g of 2-propanol, which had been dehydrated in advance, 20 g of the thus heat-treated powder, and 5.416 g of a dinitrodiammine platinum aqueous solution (the concentration of Pt was 4.616% by weight) were admixed, and were stirred for 2 hours. Thereafter, the mixture was filtered, and the resulting cake was washed with 2-propanol. The cake was dried at 120° C. for 24 hours, and was subjected to a heat treatment in air at 500° C. for an hour. Thus, a catalyst of this example was prepared. The resulting catalyst powder was hollow, and exhibited a BET specific surface area of 42 $m^2/g$.

The arrangement of this catalyst was as follows: Pt was loaded in an amount of 1.25% by weight on the catalyst support whose composition was Ba:Al:O= 1.000:12.00:19.00 by elemental molar ratio.

EXAMPLE NO. 18

Except that 100 g of a 0.3 mol/L titanium tetrachloride aqueous solution was used instead of 100 g of the 0.3 mol/L barium nitrate solution, and that 4.428 g of an $Rh(NO_3)_3 \cdot 2H_2O$ aqueous solution (the concentration of Rh was 3.035% by weight) was used instead of 5.416 g of the dinitrodiammine platinum aqueous solution (the concentration of Pt was 4.616% by weight), a catalyst was prepared in the same manner as Example No. 17. The resulting catalyst powder was hollow, and exhibited a BET specific surface area of 56 $m^2/g$.

The arrangement of this catalyst was as follows: Rh was loaded in an amount of 0.672% by weight on the catalyst support whose composition was Ti:Al:O=1.000:12.00:20.00 by elemental molar ratio.

EXAMPLE NO. 19

Except that 3.332 g of a dinitrodiammine platinum aqueous solution (the concentration of Pt was 4.616% by weight) and 1.015 g of an $Rh(NO_3)_3 \cdot 2H_2O$ aqueous solution (the concentration of Rh was 3.035% by weight) were used instead of 5.416 g of the dinitrodiammine platinum aqueous solution (the concentration of Pt was 4.616% by weight), a catalyst was prepared in the same manner as Example No. 17. The resulting catalyst powder was hollow, and exhibited a BET specific surface area of 50 $m^2/g$.

The arrangement of this catalyst was as follows: Pt was loaded in an amount of 0.769% by weight on the catalyst support whose composition was Ba:Al:O= 1.000:12.00:19.00 by elemental molar ratio; and Rh was loaded in an amount of 0.154% by weight thereon.

EXAMPLE NO. 20

Except that 80 g of a 0.3 mol/L barium nitrate aqueous solution and 20 g of a 0.3 mol/L lanthanum nitrate aqueous solution were used instead of 100 g of the 0.3 mol/L barium nitrate solution, and that 3.332 g of a dinitrodiammine platinum aqueous solution (the concentration of Pt was 4.616% by weight) and 1.015 g of an $Rh(NO_3)_3 \cdot 2H_2O$ aqueous solution (the concentration of Rh was 3.035% by weight) were used instead of 5.416 g of the dinitrodiammine platinum aqueous solution (the concentration of Pt was 4.616% by weight), a catalyst was prepared in the same manner as Example No. 17. The resulting catalyst powder was hollow, and exhibited a BET specific surface area of 43 $m^2/g$.

The arrangement of this catalyst was as follows: Pt was loaded in an amount of 0.769% by weight on the catalyst support whose composition was Ba:La:Al:O= 0.800:0.200:12.00:19.10 by elemental molar ratio; and Rh was loaded in an amount of 0.154% by weight thereon.

Comparative Example No. 1

50 g of a $\gamma$-$Al_2O_3$ powder was added to 13.54 g of a dinitrodiammine platinum aqueous solution (the concentration of Pt was 4.616% by weight). Note that the $\gamma$-$Al_2O_3$ powder exhibited a BET specific surface area of 180 $m^2/g$. While stirring, the mixture was heated on a hot plate to evaporate the water content. The dehydrated product was dried at 120° C. for 24 hours, and was thereafter calcined in air at 500° C. for an hour. Thus, a catalyst of Comparative Example No. 1 was prepared. In this catalyst, Pt was loaded in an amount of 1.250% by weight on $\gamma$-$Al_2O_3$.

Comparative Example No. 2

Except the following arrangements, a catalyst of Comparative Example No. 2 was prepared in the same manner as Comparative Example No. 1. Namely, 9.857 g of a dinitrodiammine platinum aqueous solution (the concentration of Pt was 4.616% by weight) and 2.965 g of an $Rh(NO_3)_3 \cdot 2H_2O$ aqueous solution (the concentration of Rh was 3.035% by weight) were added to 200 g of deionized water. 50 g of a $\gamma$-$Al_2O_3$ powder was further added to the mixture. Note that the $\gamma$-$Al_2O_3$ powder exhibited a BET specific surface area of 180 $m^2/g$ While stirring, the mixture was heated on a hot plate to evaporate the water content. In this catalyst, Pt was loaded in an amount of 0.910% by weight on $\gamma$-$Al_2O_3$, and Rh was loaded in an amount of 0.180% by weight thereon.

Comparative Example No. 3

Except the following arrangements, a catalyst of Comparative Example No. 3 was prepared in the same manner as Comparative Example No. 1. Namely, 10.87 g of an Rh(NO$_3$)$_3$·2H$_2$O aqueous solution (the concentration of Rh was 3.035% by weight) was added to 200 g of deionized water. 50 g of a γ-Al$_2$O$_3$ powder was further added to the mixture. Note that the γ-Al$_2$O$_3$ powder exhibited a BET specific surface area of 180 m$^2$/g. While stirring, the mixture was heated on a hot plate to evaporate the water content. In this catalyst, Rh was loaded in an amount of 0.660% by weight on γ-Al$_2$O$_3$.

Comparative Example No. 4

Except the following arrangements, a catalyst of Comparative Example No. 4 was prepared in the same manner as Comparative Example No. 1. Namely, 8.525 g of a palladium nitrate aqueous solution (the concentration of Pd was 4.000% by weight) was added to 200 g of deionized water. 50 g of a γ-Al$_2$O$_3$ powder was further added to the mixture. Note that the γ-Al$_2$O$_3$ powder exhibited a BET specific surface area of 180 m$^2$/g. While stirring, the mixture was heated on a hot plate to evaporate the water content. In this catalyst, Pd was loaded in an amount of 0.680% by weight on γ-Al$_2$O$_3$.

Comparative Example No. 5

16.93 g of a dinitrodiammine platinum aqueous solution (the concentration of Pt was 4.616% by weight) was added to 200 g of deionized water. 50 g of a γ-Al$_2$O$_3$ powder and 12.53 g of BaO powder were further added to the mixture. Note that the γ-Al$_2$O$_3$ powder exhibited a BET specific surface area of 180 m$^2$/g. While stirring, the mixture was heated on a hot plate to evaporate the water content. The dehydrated product was dried at 120 9C. for 24 hours, and was thereafter calcined in air at 500° C. for an hour. Thus, a catalyst of Comparative Example No. 5 was prepared. The arrangement of this catalyst was as follows: Pt was loaded in an amount of 1.250% by weight on the catalyst support whose Al to Ba ratio was 6 (ie., Al/Ba=6) by elemental molar ratio.

Comparative Example No. 6

12.52 g of an Rh(NO$_3$)$_3$·2H$_2$O aqueous solution (the concentration of Rh was 3.035% by weight) was added to 200 g of deionized water. 50 g of a γ-Al$_2$O$_3$ powder and 6.528 g of a TiO$_2$ powder were further added to the mixture. Note that the γ-Al$_2$O$_3$ powder exhibited a BET specific surface area of 180 m$^2$/g. While stirring, the mixture was heated on a hot plate to evaporate the water content. The dehydrated product was dried at 120° C. for 24 hours, and was thereafter calcined in air at 500° C. for an hour. Thus, a catalyst of Comparative Example No. 6 was prepared. The arrangement of this catalyst was as follows: Rh was loaded in an amount of 0.672% by weight on the catalyst support whose Al to Ti ratio was 6 (i.e., Al/Ti=6) by elemental molar ratio.

Comparative Example No. 7

9.309 g of a dinitrodiammine platinum aqueous solution (the concentration of Pt was 4.616% by weight) and 2.835 g of an Rh(NO$_3$)$_3$·2H$_2$O aqueous solution (the concentration of Rh was 3.035% by weight) were added to 200 g of deionized water. 50 g of a γ-Al$_2$O$_3$ powder and 5.8717 g of an FeO powder were further added to the mixture. Note that the γ-Al$_2$O$_3$ powder exhibited a BET specific surface area of 180 m$^2$/g. While stirring, the mixture was heated on a hot plate to evaporate the water content. The dehydrated product was dried at 120° C. for 24 hours, and was thereafter calcined in air at 500° C. for an hour. Thus, a catalyst of Comparative Example No. 7 was prepared. The arrangement of this catalyst was as follows: Pd was loaded in an amount of 0.769% by weight on the catalyst support whose Al to Fe ratio was 6 (i.e., Al/Fe=6) by elemental molar ratio; and Rh was loaded in an amount of 0.154% by weight thereon.

Comparative Example No. 8

16.98 g of a dinitrodiammine platinum aqueous solution (the concentration of Pt was 4.616% by weight) was added to 200 g of deionized water. 50 g of a γ-Al$_2$O$_3$ powder, 10.03 g of a BaO powder and 2.663 g of an La$_2$O$_3$ powder were further added to the mixture. Note that the γ-Al$_2$O$_3$ powder exhibited a BET specific surface area of 180 m$^2$/g. While stirring, the mixture was heated on a hot plate to evaporate the water content. The dehydrated product was dried at 120° C. for 24 hours, and was thereafter calcined in air at 500° C. for an hour. Thus, a catalyst of Comparative Example No. 8 was prepared. The arrangement of this catalyst was as follows: Pt was loaded in an amount of 1.250% by weight on the catalyst support whose Al to the sum of Ba and La ratio was 6 (i.e., Al(Ba: 0.8+La: 0.2)=6) by elemental molar ratio.

Evaluation and Examination

The catalysts of Example Nos. 7 through 20 and the catalysts of Comparative Example Nos. 1 through 8 were pressurized by an ordinary-temperature static-hydraulic-pressure press (CIP), and were thereafter pulverized. They were formed as a pellet shape of from 1.0 to 1.7 mm in diameter. The respective pellet-shaped catalysts were disposed in an atmospheric flow type durability testing apparatus, and were subjected to a durability process. In the durability process, a rich model gas whose air-fuel ratio (A/F) was 14 and a lean model gas whose A/F was 16 were flowed alternately for every other 1 minute at a catalyst-inlet temperature of 1,000° C. for 5 hours.

After being subjected to the durability process, the respective pellet-shaped catalysts were weighed by 2.0 g, and were disposed in an atmospheric flow type reactor. While flowing a model gas which was equivalent to a stoichiometric A/F at a flow rate of 5 L/min., the temperature of the model gas was increased from room temperature to 500° C. at a rate of 20° C./min.

During the temperature increment, the respective catalysts were examined for the HC conversion and the NO conversion substantially continuously, thereby determining the temperatures at which HC and NO were purified by 50%. The results are set forth in Table 1.

TABLE 1

| | | Composition (No. of Moles) | *1 | *2 HC | NO |
|---|---|---|---|---|---|
| *3 | 7 | Pt(0.04903)-Ba(1.000)-Al(12.00)-O(19.00) | 1.250 | 280 | 274 |
| | 8 | Pt(0.00653)-Al(2.000)-O(3.000) | 1.250 | 312 | 310 |
| | 9 | Pt(0.04305)-Si(1.000)-Al(12.00)-O(20.00) | 1.250 | 320 | 319 |
| | 10 | Pt(0.04399)-Ni(1.000)-Al(12.00)-O(19.00) | 1.250 | 302 | 299 |
| | 11 | Rh(0.04156)-Ti(1.000)-Al(12.00)-O(20.00) | 0.672 | 315 | 310 |
| | 12 | Rh(0.05060)-La(1.000)-Al(12.00)-O(19.50) | 0.672 | 320 | 308 |
| | 13 | Pd(0.04849)-Mo(1.000)-Al(12.00)-O(20.50) | 0.672 | 344 | 348 |
| | 14 | Pt(0.02707)-Rh(0.01028)-Co(1.000)-Al(12.00)-O(19.00) | 0.769/0.154 | 332 | 319 |
| | 15 | Pt(0.02695)-Rh(0.01023)-Fe(1.000)-Al(12.00)-O(19.00) | 0.769/0.154 | 322 | 318 |
| | 16 | Pt(0.04915)-Ba(0.800)-La(0.200)-Al(12.00)-O(19.10) | 1.250 | 283 | 286 |
| | 17 | Pt/Ba(1.000)-Al(12.00)-O(19.00) | 1.250 | 299 | 296 |
| | 18 | Rh/Ti(1.000)-Al(12.00)-O(20.00) | 0.672 | 328 | 303 |
| | 19 | Pt.Rh/Ba(1.000)-Al(12.00)-O(19.00) | 0.769/0.154 | 280 | 272 |
| | 20 | Pt.Rh/Ba(0.800)-La(0.200)-Al(12.00)-O(19.10) | 0.769/0.154 | 308 | 300 |
| *4 | 1 | Pt/$Al_2O_3$ | 1.250 | 332 | 330 |
| | 2 | Pt. Rh/$Al_2O_3$ | 0.91/0.18 | 314 | 307 |
| | 3 | Rh/$Al_2O_3$ | 0.660 | 322 | 313 |
| | 4 | Pd/$Al_2O_3$ | 0.680 | 368 | 386 |
| | 5 | Pt/BaO/$Al_2O_3$ | 1.250 | 373 | 338 |
| | 6 | Rh/$TiO_{2/Al2}O_3$ | 0.672 | 432 | 351 |
| | 7 | Pt.Rh/FeO/$Al_2O_3$ | 0.769/0.154 | 355 | 320 |
| | 8 | Pt/BaO/$La_2O_{3/Al2}O_3$ | 1.250 | 369 | 356 |

Note:
*1 denotes "Noble Metal Loading Amount (% by Weight)".
*2 denotes "50% conversion Temperature (° C.)".
*3 denotes "Example".
*4 denotes "Comparative Example".

It is understood from Table 1 that, when the catalysts whose loading amounts of the noble metals were identical are compared with each other, the contents of Table 2 are appreciated.

TABLE 2

Purifying Performance after Durability Process

| | | |
|---|---|---|
| Ex. No. 7 | > | Comp. Ex. No. 5 |
| Ex. No. 8 | > | Comp. Ex. No. 1 |
| Ex. Nos. 9 & 10 | > | Comp. Ex. Nos. 1 & 5 |
| Ex. Nos. 11 & 12 | > | Comp. Ex. Nos. 3 & 6 |
| Ex. No. 13 | > | Comp. Ex. No. 4 |
| Ex. Nos. 14 & 15 | > | Comp. Ex. No. 7 |
| Ex. No. 16 | > | Comp. Ex. No. 8 |

Namely, when the catalysts whose loading amounts of the noble metals were identical, the catalysts of examples were superior to those of comparative examples in the purifying performance after the durability process. This advantage apparently resulted from the composite oxide powders which were produced by spraying and burning the W/O emulsions.

Moreover, it is understood from Table 1 that the catalysts are evaluated as set forth in Table 3.

TABLE 3

Purifying Performance after Durability Process

| | | |
|---|---|---|
| Ex. No. 17 | > | Comp. Ex. No. 5 |
| Ex. No. 18 | > | Comp. Ex. No. 6 |
| Ex. No. 19 | > | Comp. Ex. Nos. 2 & 7 |
| Ex. No. 20 | > | Comp. Ex. No. 7 |

Namely, when the catalysts whose compositions were the same or substantially the same and whose loading amounts of the noble metals were identical are compared with each other, the catalysts of examples were superior to those of comparative examples in the purifying performance after the durability process. This advantage apparently resulted from the composite oxide powders which were produced by spraying and burning the W/O emulsions.

EXAMPLE NO. 21

2.95 g of barium nitrate was dissolved into 2,000 g of deionized water. Then, 12.5 g of a dinitrodiammine platinum aqueous solution (the concentration of Pt was 4.00% by weight), 67.7 g of $Mg(NO_3)_2 \cdot 6H_2O$ and 199.0 g of $Al(NO_3)_3 \cdot 9H_2O$ were further added and dissolved into the deionized water. A mixture solution was thus prepared.

Whilst, 80 g of an emulsifier ("SUN SOFT No. 818H" made by Taiyo Kagaku Co., Ltd.) was added to 1,066 g of kerosene. While stirring the mixture with a homogenizer at a revolving speed of 10,000 rpm, all of the mixture solution was added to the mixture little by little. After all of the mixture solution was added, the mixture was kept to be stirred by the homogenizer for 10 minutes. A W/O type emulsion was thus prepared. According to the result of an observation using an optical microscope, the particle diameter of the dispersion particles in the W/O type emulsion fell in the range of from about 1 to 2 μm.

The resulting W/O type emulsion was sprayed and burned in the same manner as Example No. 1. The resulting composite oxide powder was collected with a bag filter. This composite oxide powder was subjected to a heat treatment in air at 800° C. for 3 hours, thereby making a catalyst of this example. The resulting catalyst powder was hollow, and exhibited a BET specific surface area of 69 $m^2/g$.

The arrangement of this catalyst was Pt:Ba:Mg:Al:O= 0.009664:0.04252:0.9961:2.000:4.058 by elemental molar ratio. Note that the content of Pt was 1.250% by weight.

EXAMPLE NO. 22

Except that 6.59 g of an $Rh(NO_3)_3 \cdot 2H_2O$ aqueous solution (the concentration of Rh was 4.00% by weight) was used instead of 12.5 g of the dinitrodiammine platinum aqueous solution (the concentration of Pt was 4.00% by weight), a catalyst of Example No. 22 was prepared in the same manner as Example No. 21. The resulting catalyst powder was hollow, and exhibited a BET specific surface area of 65 m$^2$/g.

The arrangement of this catalyst was Rh:Ba:Mg:Al:O= 0.009664:0.04252:0.9961:2.000:4.058 by elemental molar ratio. Note that the content of Rh was 0.65% by weight.

EXAMPLE NO. 23

Except that 6.82 g of a Pd(NO$_3$)$_2$ aqueous solution (the concentration of Pd was 4.00% by weight) was used instead of 12.5 g of the dinitrodiammine platinum aqueous solution (the concentration of Pt was 4.00% by weight), a catalyst of Example No. 23 was prepared in the same manner as Example No. 21. The resulting catalyst powder was hollow, and exhibited a BET specific surface area of 59 m$^2$/g.

The arrangement of this catalyst was Pd:Ba:Mg:Al:O= 0.009664:0.04252:0.9961:2.000:4.058 by elemental molar ratio. Note that the content of Pd was 0.69% by weight.

EXAMPLE NO. 24

Except the following mixture solution was prepared, a catalyst of Example No. 24 was prepared in the same manner as Example No. 21. For instance, 29.8 g of strontium nitrate was dissolved into 600 g of deionized water. Then, 12.5 g of a dinitrodiammine platinum aqueous solution (the concentration of Pt was 4.00% by weight), 42.4 g of Mg(NO$_3$)$_2$·6H$_2$O and 133.6 g of Al(NO$_3$)$_3$·9H$_2$O were further added and dissolved into the deionized water. A mixture solution was thus prepared. The resulting catalyst powder was hollow, and exhibited a BET specific surface area of 64 m$^2$/g.

The arrangement of this catalyst was Pt:Sr:Mg:Al:O= 0.01439:0.7917:0.9280:2.000:4.749 by elemental molar ratio. Note that the content of Pt was 1.25% by weight.

EXAMPLE NO. 25

Except the following mixture solution was prepared, a catalyst of Example No. 25 was prepared in the same manner as Example No. 21. For instance, 10.2 g of barium nitrate was dissolved into 600 g of deionized water. Then, 12.5 g of a dinitrodiammine platinum aqueous solution (the concentration of Pt was 4.00% by weight), 237 g of strontium nitrate and 180.1 g of Al(NO$_3$)$_3$·9H$_2$O were further added and dissolved into the deionized water. A mixture solution was thus prepared. The resulting catalyst powder was hollow, and exhibited a BET specific surface area of 56 m$^2$/g.

The arrangement of this catalyst was Pt:Ba:Sr:Al:O= 0.06365:0.9745:02801:12.00:19.38 by elemental molar ratio. Note that the content of Pt was 1.25% by weight.

EXAMPLE NO. 26

23.9 g of barium nitrate was dissolved into 3,000 g of deionized water. Then, 12.5 g of a dinitrodiammine platinum aqueous solution (the concentration of Pt was 4.00% by weight) and 187.9 g of Al(NO$_3$)$_3$·9H$_2$O were further added and dissolved into the deionized water. A mixture solution was thus prepared.

Whilst, 120 g of an emulsifier ("SUN SOFT No. 818H" made by Taiyo Kagaku Co., Ltd.) was dissolved into 1,600 g of kerosene. While stirring the mixture with a homogenizer at a revolving speed of 10,000 rpm, all of the mixture solution was added to the mixture little by little. After all of the mixture solution was added, the mixture was kept to be stirred by the homogenizer for 10 minutes. A W/O type emulsion was thus prepared. The resulting W/O type emulsion was sprayed and burned in the same manner as Example No. 1, and a catalyst of Example No. 26 was prepared similarly. The resulting catalyst powder was hollow, and exhibited a BET specific surface area of 48 m$^2$/g.

The arrangement of this catalyst was Pt:Ba:Al:O= 0.02379:1.095:6.000:10.14 by elemental molar ratio. Note that the content of Pt was 1.250% by weight.

EXAMPLE NO. 27

90.1 g of Mg(NO$_3$)$_2$·6H$_2$O was dissolved into 3,000 g of deionized water. Then, 263.7 g of Al(NO$_3$)$_3$·9H$_2$O was further added and dissolved into the deionized water. A mixture solution was thus prepared.

Subsequently, 120 g of an emulsifier ("SUN SOFT No. 818H" made by Taiyo Kagaku Co., Ltd.) was dissolved into 1,600 g of kerosene. While stirring the mixture with a homogenizer at a revolving speed of 10,000 rpm, all of the mixture solution was added to the mixture little by little. After all of the mixture solution was added, the mixture was kept to be stirred by the homogenizer for 10 minutes. A W/O type emulsion was thus prepared. The resulting W/O type emulsion was sprayed and burned in the same manner as Example No. 1, and calcined similarly to prepare a composite oxide powder. This composite oxide powder exhibited a BET specific surface area of 34 m$^2$/g.

Whilst, 75 g of 2-propanol and 25 g of 2-methoxymethanol were mixed. Into this mixture solvent, 0.756 g of Pt(C$_5$H$_7$O$_2$)$_2$ and 1.964 g of Ba(OC$_3$H$_7$)$_2$ were charged, and were stirred under reflux for 4 hours. Thus, an alkoxide solution was prepared.

Moreover, 75 g of 2-propanol and 25 g of 2-methoxymethanol were mixed. Into this mixture solvent, the aforementioned composite oxide powder was added in an amount of 28.39 g, and was stirred. Then, the mixture was heated to 70° C. Thus, a dispersion was prepared.

Subsequently, the aforementioned alkoxide solution was heated to 70° C., and was added to the aforementioned dispersion which was held at 70° C. The mixture was stirred at 70° C. under reflux for 3 hours. Thereafter, 0.21 g of deionized water was added to the mixture. The mixture was further refluxed at 70° C. for 3 hours, thereby carrying out hydrolyzing and aging. The resulting suspension was degreased with an aspirator at 100° C., and was further degreased in a nitrogen gas flow at 300° C. Then, the resulting product was aged in air at 500° C. for 3 hours. Thus, a catalyst of Example No. 27 was prepared. The resulting catalyst powder was hollow, and exhibited a BET specific surface area of 42 m$^2$/g.

The arrangement of this catalyst was as follows: the structure whose composition was Pt:Ba:O= 0.009634:0.03853:0.0578 by molar ratio was loaded on the catalyst support whose composition was Mg:Al:O= 1.000:2.000:4.000 by molar ratio. Note that the loading amount of Pt was 1.25% by weight.

EXAMPLE NO. 28

8.51 g of barium nitrate was dissolved into 3,000 g of deionized water. Then, 75.13 g of Mg(NO$_3$)$_2$·6H$_2$O and 244.3 g of Al(NO$_3$)$_3$·9H$_2$O were further dissolved into the deionized water. A mixture solution was thus prepared.

Subsequently, 120 g of an emulsifier ("SUN SOFT No. 818H" made by Taiyo Kagaku Co., Ltd.) was dissolved into 1,600 g of kerosene. While stirring the mixture with a homogenizer at a revolving speed of 10,000 rpm, all of the mixture solution was added to the mixture little by little. After all of the mixture solution was added, the mixture was kept to be stirred by the homogenizer for 10 minutes. A W/O type emulsion was thus prepared. The resulting W/O type emulsion was sprayed and burned in the same manner as Example No. 1, and calcined similarly to prepare a composite oxide powder. This composite oxide powder exhibited a BET specific surface area of 32 m$^2$/g.

Whilst, 75 g of 2-propanol and 25 g of 2-methoxymethanol were mixed. Into this mixture solvent, 0.755 g of $Pt(C_5H_7O_2)_2$ and 1.963 g of $Ba(OC_3H_7)_2$ were charged, and were stirred under reflux for 4 hours. Thus, an alkoxide solution was prepared.

Moreover, 75 g of 2-propanol and 25 g of 2-methoxymethanol were mixed. Into this mixture solvent, the aforementioned composite oxide powder was added in an amount of 28.36 g, and was stirred. Then, the mixture was heated to 70° C. Thus, a dispersion was prepared.

Subsequently, the aforementioned alkoxide solution was heated to 70° C., and was added to the aforementioned dispersion which was held at 70° C. The mixture was stirred at 70° C. under reflux for 3 hours. Thereafter, 0.21 g of deionized water was added to the mixture. The mixture was further refluxed at 70° C. for 3 hours, thereby carrying out hydrolyzing and aging. The resulting suspension was degreased with an aspirator at 100° C., and was further degreased in a nitrogen gas flow at 300° C. Then, the resulting product was aged in air at 500° C. for 3 hours. Thus, a catalyst of Example No. 28 was prepared. The resulting catalyst powder was hollow, and exhibited a BET specific surface area of 28 m$^2$/g.

The arrangement of this catalyst was as follows: the structure whose composition was Pt:Ba:O= 0.01040:0.04160:0.06239 by molar ratio was loaded on the catalyst support whose composition was Ba:Mg:Al:O= 0.100:0.900:2.000:4.000 by molar ratio. Note that the loading amount of Pt was 1.25% by weight.

EXAMPLE NO. 29

7.12 g of strontium nitrate was dissolved into 3,000 g of deionized water. Then, 77.65 g of $Mg(NO_3)_2 \cdot 6H_2O$ and 252.4 g of $Al(NO_3)_3 \cdot 9H_2O$ were further added and dissolved into the deionized water. A mixture solution was thus prepared.

Subsequently, 120 g of an emulsifier ("SUN SOFT No. 818H" made by Taiyo Kagaku Co., Ltd.) was dissolved into 1,600 g of kerosene. While stirring the mixture with a homogenizer at a revolving speed of 10,000 rpm, all of the mixture solution was added to the mixture little by little. After all of the mixture solution was added, the mixture was kept to be stirred by the homogenizer for 10 minutes. A W/O type emulsion was thus prepared. The resulting W/O type emulsion was sprayed and burned in the same manner as Example No. 1, and calcined similarly to prepare a composite oxide powder. This composite oxide powder exhibited a BET specific surface area of 29 m$^2$/g.

Whilst, 75 g of 2-propanol and 25 g of 2-methoxymethanol were mixed. Into this mixture solvent, 0.941 g of $Ir(C_5H_7O_2)_3$ and 1.582 g of $Sr(OC_3H_7)_2$ were charged, and were stirred under reflux for 4 hours. Thus, an alkoxide solution was prepared.

Moreover, 75 g of 2-propanol and 25 g of 2-methoxymethanol were mixed. Into this mixture solvent, the aforementioned composite oxide powder was added in an amount of 28.77 g, and was stirred. Then, the mixture was heated to 70° C. Thus, a dispersion was prepared.

Subsequently, the aforementioned alkoxide solution was heated to 70° C., and was added to the aforementioned dispersion which was held at 70° C. The mixture was stirred at 70° C. under reflux for 3 hours. Thereafter, 0.21 g of deionized water was added to the mixture. The mixture was further refluxed at 70° C. for 3 hours, thereby carrying out hydrolyzing and aging. The resulting suspension was degreased with an aspirator at 100° C., and was further degreased in a nitrogen gas flow at 300° C. Then, the resulting product was aged in air at 500° C. for 3 hours. Thus, a catalyst of Example No. 29 was prepared. The resulting catalyst powder was hollow, and exhibited a BET specific surface area of 33 m$^2$/g.

The arrangement of this catalyst was as follows: the structure whose composition was Ir:Sr:O= 0.009927:0.03971:0.05956 by molar ratio was loaded on the catalyst support whose composition was Sr:Mg:Al:O= 0.100:0.900:2.000:4.000 by molar ratio. Note that the loading amount of Ir was 1.23% by weight.

Comparative Example No. 9

50 g of a $\gamma$-$Al_2O_3$ powder was added to 13.13 g of a dinitrodiammine platinum aqueous solution (the concentration of Pt was 4.00% by weight). Note that the $\gamma$-$Al_2O_3$ powder exhibited a BET specific surface area of 180 m$^2$/g. While stirring, the mixture was heated on a hot plate to evaporate the water content. The dehydrated product was dried at 120° C. for 24 hours, and was thereafter calcined in air at 500° C. for an hour. Thus, a catalyst of Comparative Example No. 9 was prepared. In this catalyst, Pt was loaded in an amount of 1.25% by weight on $\gamma$-$Al_2O_3$.

Comparative Example No. 10

Except the following arrangements, a catalyst of Comparative Example No. 10 was prepared in the same manner as Comparative Example No. 9. Namely, 11.32 g of a dinitrodiammine platinum aqueous solution (the concentration of Pt was 4.00% by weight) and 3.02 g of an $Rh(NO_3)_3 \cdot 2H_2O$ aqueous solution (the concentration of Rh was 3.00% by weight) were added to 200 g of deionized water. 49.5 g of a $\gamma$-$Al_2O_3$ powder was further added to the mixture. Note that the $\gamma$-$Al_2O_3$ powder exhibited a BET specific surface area of 180 m$^2$/g. While stirring, the mixture was heated on a hot plate to evaporate the water content. In this catalyst, Pt was loaded in an amount of 0.91% by weight on $\gamma$-$Al_2O_3$, and Rh was loaded in an amount of 0.18% by weight thereon.

Comparative Example No. 11

Except the following arrangements, a catalyst of Comparative Example No. 11 was prepared in the same manner as Comparative Example No. 9. Namely, 10.99 g of an $Rh(NO_3)_3 \cdot 2H_2O$ aqueous solution (the concentration of Rh was 3.00% by weight) was added to 200 g of deionized water. 49.7 g of a $\gamma$-$Al_2O_3$ powder was further added to the mixture. Note that the $\gamma$-$Al_2O_3$ powder exhibited a BET specific surface area of 180 m$^2$/g. While stirring, the mixture was heated on a hot plate to evaporate the water content. In this catalyst, Rh was loaded in an amount of 0.66% by weight on $\gamma$-$Al_2O_3$.

Comparative Example No. 12

Except the following arrangements, a catalyst of Comparative Example No. 12 was prepared in the same manner as Comparative Example No. 9. Namely, 8.525 g of a palladium nitrate aqueous solution (the concentration of Pd was 4.00% by weight) was added to 200 g of deionized water. 49.7 g of a γ-$Al_2O_3$ powder was further added to the mixture. Note that the γ-$Al_2O_3$ powder exhibited a BET specific surface area of 180 $m^2$/g. While stirring, the mixture was heated on a hot plate to evaporate the water content. In this catalyst, Pd was loaded in an amount of 0.68% by weight on γ-$Al_2O_3$.

Comparative Example No. 13

Except the following arrangements, a catalyst of Comparative Example No. 13 was prepared in the same manner as Comparative Example No. 9. Namely, 1.069 g of iridium tetrachloride was added to 200 g of deionized water. 49.4 g of a γ-$Al_2O_3$ powder was further added to the mixture. Note that the γ-$Al_2O_3$ powder exhibited a BET specific surface area of 180 $m^2$/g. While stirring, the mixture was heated on a hot plate to evaporate the water content. In this catalyst, Ir was loaded in an amount of 1.23% by weight on γ-$Al_2O_3$.

Comparative Example No. 14

0.756 g of Pt($C_5H_7O_2$)$_2$, 2.161 g of Ba($OC_3H_7$)$_2$, 28.23 g of Mg($OC_3H_7$)$_2$ and 8125 g of Al($OC_3H_7$)$_3$ were charged into 1,000 g of 2-propanol. The mixture was stirred under reflux at 70° C. for 1 hour. Thus, an alkoxide solution was prepared. To this alkoxide solution, 14.5 g of deionized water was added. The alkoxide solution was further refluxed at 70° C. for 3 hours, thereby carrying out hydrolyzing and aging.

The resulting gel was degreased with an aspirator at 100° C., and was further degreased in a nitrogen gas flow at 300° C. Then, the resulting product was aged in air at 500° C. for 3 hours. Thus, a catalyst of Comparative Example No. 14 was prepared. The arrangement of this catalyst was as follows: the composition was Pt:Ba:Mg:Al:O= 0.009664:0.04252:0.9961:2.000:4.058 by molar ratio; and the loading amount of Pt was 1.25% by weight.

Comparative Example No. 15

1.040 g of Pt($C_5H_7O_2$)$_2$, 31.11 g of Ba($OC_3H_7$)$_2$, and 136.3 g of Al($OC_3H_7$)$_3$ were charged into 1,000 g of 2-propanol. The mixture was stirred under reflux at 70° C. for 1 hour. Thus, an alkoxide solution was prepared. To this alkoxide solution, 14.5 g of deionized water was added. The alkoxide solution was further refluxed at 70° C. for 3 hours, thereby carrying out hydrolyzing and aging.

The resulting gel was degreased with an aspirator at 100° C., and was further degreased in a nitrogen gas flow at 300° C. Then, the resulting product was aged in air at 500° C. for 3 hours. Thus, a catalyst of Comparative Example No. 15 was prepared. The arrangement of this catalyst was as follows: the composition was Pt:Ba:Al:O= 0.02379:1.095:6.000:10.14 by molar ratio; and the loading amount of Pt was 1.25% by weight.

Comparative Example No. 16

0.9409 g of Ir($C_5H_7O_2$)$_2$, 5.566 g of Sr($OC_3H_7$)$_2$, 24.83 g of Mg($OC_3H_7$)$_2$ and 79.09 g of Al($OC_3H_7$)$_3$ were charged into 1,000 g of 2-propanol. The mixture was stirred under reflux at 70° C. for 1 hour. Thus, an alkoxide solution was prepared. To this alkoxide solution, 14.1 g of deionized water was added. The alkoxide solution was further refluxed at 70° C. for 3 hours, thereby carrying out hydrolyzing and aging.

The resulting gel was degreased with an aspirator at 100° C., and was further degreased in a nitrogen gas flow at 300° C. Then, the resulting product was aged in air at 500° C. for 3 hours. Thus, a catalyst of Comparative Example No. 16 was prepared. The arrangement of this catalyst was as follows: the composition was Ir:Sr:Mg:Al:O= 0.009927:0.13971:0.900:2.000:4.0596 by molar ratio; and the loading amount of Ir was 1.23% by weight.

Evaluation and Examination

The catalysts of Example Nos. 21 through 29 and the catalysts of Comparative Example Nos. 10 through 16 were pressurized by an ordinary-temperature static-hydraulic-pressure press (CIP), and were thereafter pulverized. They were formed as a pellet shape of from 1.0 to 1.7 mm in diameter. The respective pellet-shaped catalysts were disposed in an atmospheric flow type durability testing apparatus, and were subjected to a durability process. In the durability process, a rich model gas whose air-fuel ratio (A/F) was 14 and a lean model gas whose A/F was 16 were flowed alternately for every other 1 minute at a catalyst-inlet temperature of 1,000° C. for 5 hours.

After being subjected to the durability process, the respective pellet-shaped catalysts were weighed by 2.0 g, and were disposed in an atmospheric flow type reactor. While flowing a model gas which was equivalent to a stoichiometric A/F at a flow rate of 5 L/min., the temperature of the model gas was increased from room temperature to 500° C. at a rate of 20° C./min.

During the temperature increment, the respective catalysts were examined for the HC conversion and the NO conversion substantially continuously, thereby determining the temperatures at which HC and NO were purified by 50%. The results are set forth in Table 4.

TABLE 4

| | | Composition | | *2 | |
|---|---|---|---|---|---|
| | | (No. of Moles) | *1 | HC | NO |
| *3 | 21 | Pt(0.009664)-Ba(0.04252)-Mg(0.9961)-Al(2.000)-O(4.058) | 1.25 | 274 | 275 |
| | 22 | Rh(0.009664)-Ba(0.04252)-Mg(0.9961)-Al(2.000)-O(4.058) | 0.65 | 303 | 297 |
| | 23 | Pd(0.009664)-Ba(0.04252)-Mg(0.9961)-Al(2.000)-O(4.058) | 0.69 | 326 | 361 |
| | 24 | Pt(0.01439)-Sr(0.7917)-Mg(0.9280)-Al(2.000)-O(4.749) | 1.25 | 281 | 280 |
| | 25 | Pt(0.06365)-Ba(0.9745)-Sr(0.2801 )-Al(12.00)-O(19.38) | 1.25 | 286 | 289 |
| | 26 | Pt(0.02379)-Ba(1.095)-Al(6.000)-O(10.14) | 1.25 | 302 | 306 |
| | 27 | [Pt(0.009634)-Ba(0.03853)-O(0.0578)]/Mg( 1.000)-Al(2.00O)-O(4.000) | 1.25 | 290 | 294 |
| | 28 | [Pt(0.01040)-Ba(0.04160)-O(0.06239)]/Ba(0.100)-Mg(0.900)-Al(2.000)-O(4.000) | 1.25 | 278 | 279 |
| | 29 | [Ir(0.009927)-Sr(0.03971)-O(0.05956)]/Sr(0.100)-Mg(0.900)-Al(2.000)-O(4.000) | 1.23 | 304 | 313 |
| *4 | 9 | Pt/$Al_2O_3$ | 1.25 | 332 | 330 |

TABLE 4-continued

| Composition | | *2 | |
|---|---|---|---|
| (No. of Moles) | *1 | HC | NO |
| 10 Pt.Rh/Al$_2$O$_3$ | 0.91/0.18 | 314 | 307 |
| 11 Rh/Al$_2$O$_3$ | 0.66 | 322 | 313 |
| 12 Pd/Al$_2$O$_3$ | 0.68 | 368 | 386 |
| 13 Ir/Al$_2$O$_3$ | 1.23 | 341 | 348 |
| 14 Pt(0.009664)-Ba(0.04252)-Mg(0.9961)-Al(2.000)-O(4.058)alkoxide | 1.25 | 317 | 322 |
| 15 Pt(0.02379)-Ba(1.095)-Al(6.000)-O(10.14)alkoxide | 1.25 | 326 | 329 |
| 16 Ir(0.009927)-Sr(0.13971)-Mg(0.900)-Al(2.000)-O(4.0596)alkoxide | 1.23 | 330 | 343 |

Note:
*1 denotes "Noble Metal Loading Amount (% by Weight)".
*2 denotes "50% conversion Temperature (° C.)".
*3 denotes "Example".
*4 denotes "Comparative Example".

It is understood from Table 4 that, when the catalysts whose noble metals were the same and whose and loading amounts of the noble metals were identical are compared with each other, the contents of Table 5 are appreciated.

TABLE 5

| Purifying Performance after Durability Process | | |
|---|---|---|
| Ex. No. 21, 24, 25, 26, 27 & 28 | > | Comp. Ex. No. 9 |
| Ex. No. 22 | > | Comp. Ex. No. 11 |
| Ex. No. 23 | > | Comp. Ex. No. 12 |
| Ex. No. 29 | > | Comp. Ex. No. 13 |

Namely, the catalysts of examples were superior to those of comparative examples in the purifying performance after the durability process. This advantage apparently resulted from the composite oxide powders which were produced by spraying and burning the W/O emulsions.

Moreover, it is understood from Table 4 that the catalysts are evaluated as set forth in Table 6.

TABLE 6

| Purifying Performance after Durability Process | | |
|---|---|---|
| Ex. No. 21 | > | Comp. Ex. No. 14 |
| Ex. No. 26 | > | Comp. Ex. No. 15 |
| Ex. No. 29 | > | Comp. Ex. No. 16 |

Namely, when the catalysts whose compositions were the same are compared with each other, the catalysts of examples were superior to those of comparative examples in the purifying performance after the durability process. This advantage apparently resulted from the following arrangements: whilst the catalysts of comparative examples were solid, the catalysts of examples were hollow to exhibit large specific surface areas; and the catalysts of examples employed the composite oxide powders which were produced by spraying and burning the W/O emulsions.

Having now fully described the present invention, it will be apparent to one of ordinary skill in the art that many changes and modifications can be made thereto without departing from the spirit or scope of the present invention as set forth herein including the appended claims.

What is claimed is:

1. A catalyst support, comprising:
a composite oxide powder containing aluminum and at least one metallic element in addition to the aluminum selected from the group consisting of metallic elements of group IIa in the periodic table of the elements, metallic elements of group IIIa therein, metallic elements of group IVa therein, metallic elements of group Va therein, metallic elements of group VIa therein, metallic elements of group VIIa therein, metallic elements of group IIb therein, Ga, Si, Ge, Sn and noble metal elements, wherein the composite oxide powder is hollow and amorphous, produced by spraying and burning a W/O type emulsion, the W/O type emulsion including an aqueous solution dispersed in an organic solvent, the aqueous solution containing the aluminum and the at least one metallic element in addition to the aluminum.

2. The catalyst support according to claim 1, wherein said metallic element is at least one member selected from the group consisting of alkaline-earth metals and rare-earth elements.

3. The catalyst support according to claim 1, wherein said metallic element is a metallic element other than magnesium.

4. The catalyst support according to claim 1, wherein said composite oxide powder has an outside particle diameter of from 20 to 5,000 nm.

5. A catalyst comprising:
a composite oxide powder containing aluminum and a noble metal element, wherein the composite oxide powder is hollow and amorphous, produced by spraying and burning a W/O type emulsion, the W/O emulsion including an aqueous solution dispersed in an organic solvent, the aqueous solution containing the aluminum and the noble metal element.

6. The catalyst according to claim 5, wherein said composite oxide powder has an outside particle diameter of from 20 to 5,000 nm.

7. A catalyst comprising:
a composite oxide powder containing (i) aluminum, (ii) a noble metal element, and (iii) at least one metallic element selected from the group consisting of metallic elements of group IIa in the periodic table of the elements, metallic elements of group IIIa therein, metallic elements of group IVa therein, metallic elements of group Va therein, metallic elements of group VIa therein, metallic elements of group VIIa therein, metallic elements of group IIb therein, Ga, Si, Ge and Sn, wherein the composite oxide powder is hollow and amorphous, produced by spraying and burning a W/O type emulsion, the W/O type emulsion including an aqueous solution dispersed in an organic solvent, the aqueous solution containing the aluminum, the noble metal element, and the at least one metallic element.

8. The catalyst according to claim 7, wherein said composite oxide powder has an outside particle diameter of from 20 to 5,000 nm.

9. A catalyst comprising:
a catalyst support including:
a composite oxide powder containing aluminum and at least one metallic element selected from the group consisting of metallic elements of group IIa in the periodic table of the elements, metallic elements of group IIIa therein, metallic elements of group IVa therein, metallic elements of group Va therein, metallic elements of group VIa therein, metallic elements of group VIIa therein, metallic elements of group IIb therein, Ga, Si, Ge and Sn, wherein the composite oxide powder is hollow and amorphous, produced by spraying and burning a W/O type emulsion, the W/O type emulsion including an aqueous solution dispersed in an organic solvent, the aqueous solution containing the aluminum and the at least one metallic element; and
a noble metal loaded on the catalyst support.

10. The catalyst according to claim 9, wherein said composite oxide powder has an outside particle diameter of from 20 to 5,000 nm.

11. A catalyst comprising:
a catalyst support including:
a composite oxide powder containing aluminum and at least one metallic element in addition to the aluminum selected from the group consisting of metallic elements of group IIa in the periodic table of the elements, metallic elements of group IIIa therein, metallic elements of group IVa therein, metallic elements of group Va therein, metallic elements of group VIa therein, metallic elements of group VIIa therein, metallic elements of group IIb therein, Ga, Si, Ge and Sn, wherein the composite oxide powder is hollow and amorphous, produced by spraying and burning a W/O type emulsion, the W/O type emulsion including an aqueous solution dispersed in an organic solvent, the aqueous solution containing the aluminum and the at least one metallic element; and
a structure, loaded on said catalyst support, in which a noble metal is loaded on at least one member selected from the group consisting of strontium oxide and barium oxide.

12. The catalyst according to claim 11, wherein said metallic element is at least one member selected from the group of alkaline-earth metals.

13. The catalyst according to claim 11, wherein said composite oxide powder has an outside particle diameter of from 20 to 5,000 nm.

14. A process for producing a catalyst support, comprising the steps of:
preparing a W/O type emulsion including an aqueous solution dispersed in an organic solvent, the aqueous solution containing aluminum and at least one metallic element in addition to the aluminum selected from the group consisting of metallic elements of group IIa in the periodic table of the elements, metallic elements of group IIIa therein, metallic elements of group IVa therein, metallic elements of group Va therein, metallic elements of group VIa therein, metallic elements of group VIIa therein, metallic elements of group IIb therein, Ga, Si, Ge, Sn and noble metal elements; and
spraying and burning the W/O type emulsion, thereby forming a composite oxide powder.

15. The process according to claim 14, wherein said metallic element is at least one member selected from the group consisting of alkaline-earth metals and rare-earth elements.

16. The process according to claim 14, wherein said metallic element is a metallic element other than magnesium.

17. The process according to claim 14, wherein said composite oxide powder is amorphous.

18. A process for producing a catalyst, comprising the steps of:
preparing a W/O type emulsion including an aqueous solution dispersed in an organic solvent, the aqueous solution containing aluminum and a noble metal element; and
spraying and burning the W/O type emulsion, thereby forming a composite oxide powder.

19. The process according to claim 18, wherein said composite oxide powder is amorphous.

20. A process for producing a catalyst, comprising the steps of:
preparing a W/O type emulsion including an aqueous solution dispersed in an organic solvent, the aqueous solution containing (i) aluminum, (ii) a noble metal element, and (iii) at least one metallic element selected from the group consisting of metallic elements of group IIa in the periodic table of the elements, metallic elements of group IIIa therein, metallic elements of group IVa therein, metallic elements of group Va therein, metallic elements of group VIa therein, metallic elements of group VIIa therein, metallic elements of group IIb therein, Ga, Si, Ge and Sn; and
spraying and burning the W/O type emulsion, thereby forming a composite oxide powder.

21. The process according to claim 20, wherein said composite oxide powder is amorphous.

22. A process for producing a catalyst, comprising the steps of:
preparing a W/O type emulsion including an aqueous solution dispersed in an organic solvent, the aqueous solution containing aluminum and at least one metallic element selected from the group consisting of elements of group IIa in the periodic table of the elements, elements of group IIIa therein, elements of group IVa therein, elements of group Va therein, elements of group VIa therein, elements of group VIIa therein, elements of group IIb therein, Ga, Si, Ge and Sn;
spraying and burning the W/O type emulsion, thereby forming a composite oxide powder; and
loading a noble metal on the composite oxide powder.

23. The process according to claim 22, wherein said composite oxide powder is amorphous.

24. A process for producing a catalyst, comprising the steps of:
preparing a W/O type emulsion including an aqueous solution dispersed in an organic solvent, the aqueous solution containing aluminum and at least one metallic element in addition to the aluminum selected from the group consisting of metallic elements of group IIa in the periodic table of the elements, metallic elements of group IIIa therein, metallic elements of group IVa therein, metallic elements of group Va therein, metallic elements of group VIa therein, metallic elements of group VIIa therein, metallic elements of group IIb therein, Ga, Si, Ge and Sn;
spraying and burning the W/O type emulsion, thereby forming a composite oxide powder;
preparing a structure in which a noble metal is loaded on at least one member selected from the group consisting of strontium oxide and barium oxide; and loading the structure on the composite oxide powder.

25. The process according to claim 24, wherein said metallic element is at least one member selected from the group consisting of alkaline-earth metals.

26. The process according to claim 24, wherein said composite oxide powder is amorphous.

* * * * *